US009866412B2

United States Patent
Malhotra et al.

(10) Patent No.: US 9,866,412 B2
(45) Date of Patent: Jan. 9, 2018

(54) EQUALIZATION IN HIGH SPEED LINKS THROUGH IN-SITU CHANNEL ESTIMATION

(71) Applicant: Samsung Display Co., Ltd., Yongin-si, Gyeonggi-do (KR)

(72) Inventors: Gaurav Malhotra, Cupertino, CA (US); Jalil Kamali, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/230,222

(22) Filed: Aug. 5, 2016

(65) Prior Publication Data

US 2017/0222840 A1  Aug. 3, 2017

Related U.S. Application Data

(60) Provisional application No. 62/288,775, filed on Jan. 29, 2016.

(51) Int. Cl.
*H04L 25/03* (2006.01)
*H04L 25/02* (2006.01)

(52) U.S. Cl.
CPC .... *H04L 25/03885* (2013.01); *H04L 25/0212* (2013.01); *H04L 25/03038* (2013.01); *H04L 25/03057* (2013.01); *H04L 25/03343* (2013.01)

(58) Field of Classification Search
CPC ........... H03H 17/0081; H03H 17/0288; H03H 21/0012; H03H 2021/0089;
(Continued)

(56) References Cited

U.S. PATENT DOCUMENTS 8,379,711 B2  2/2013  Aziz et al.
8,503,519 B2  8/2013  Hidaka
(Continued)

FOREIGN PATENT DOCUMENTS

WO    WO 2006/056048 A1    6/2006

OTHER PUBLICATIONS

Won, et al.; An On-chip Stochastic Sigma-tracking Eye-opening Monitor for BER-optimal Adaptive Equalization, ©2015 IEE, Department of Electrical Engineering, KAIST, 4 sheets.
(Continued)

*Primary Examiner* — Young T Tse
(74) *Attorney, Agent, or Firm* — Lewis Roca Rothgerber Christie LLP

(57) ABSTRACT

A method for estimating performance of a serial communication channel using processing circuits. The channel is configured to transmit a binary input stream from a transmitting end to an output stream at a receiving end. The method includes modeling by the processing circuits the channel at the receiving end as a first finite impulse response (FIR) system. The modeling includes estimating a cursor pulse response of the first FIR system by analyzing the output stream received at the receiving end, and estimating one or more pre-cursor or post-cursor pulse responses of the first FIR system from the received output stream using the estimated cursor pulse response. The method further includes determining by the processing circuits a performance metric by using the estimated one or more pre-cursor or post-cursor pulse responses.

22 Claims, 3 Drawing Sheets

(58) Field of Classification Search
CPC ..... H03H 2021/009; H03H 2021/0092; H03H 2021/0094; H03H 2021/0098; H03H 2017/0081; H03H 2017/0288; H04L 25/03006; H04L 25/03019; H04L 25/03038; H04L 25/03057; H04L 25/03885; H04L 2025/03592; H04L 2025/03598; H04L 25/0212; H04L 25/03343
USPC ............. 375/229, 232, 233, 346, 348, 350; 708/322, 323
See application file for complete search history.

(56) References Cited

U.S. PATENT DOCUMENTS

| | | | |
|---|---|---|---|
| 8,705,672 | B2 | 4/2014 | Malipatil et al. |
| 8,837,626 | B2 | 9/2014 | Malipatil et al. |
| 8,861,583 | B2 | 10/2014 | Liu |
| 8,902,964 | B2 | 12/2014 | Aguilar-Arreola et al. |
| 8,958,512 | B1 | 2/2015 | Ding et al. |
| 9,052,900 | B2 | 6/2015 | Zhang et al. |
| 9,143,369 | B2 | 9/2015 | He et al. |
| 9,166,832 | B1 | 10/2015 | Li et al. |
| 9,237,044 | B1 | 1/2016 | Wu et al. |
| 9,397,867 | B1* | 7/2016 | Azenkot ........... H04L 25/03019 |
| 9,461,851 | B1* | 10/2016 | Liao .................... H04L 27/01 |
| 9,479,366 | B2* | 10/2016 | Zheng .............. H04L 25/03267 |
| 2010/0046600 | A1* | 2/2010 | Zerbe ................. H04L 25/0307 375/233 |
| 2012/0076181 | A1* | 3/2012 | Aziz ................ H04L 25/03057 375/219 |
| 2013/0230093 | A1* | 9/2013 | Aziz ................ H04L 25/03057 375/233 |
| 2014/0023131 | A1* | 1/2014 | Sindalovsky ..... H04L 25/03343 375/232 |
| 2014/0233619 | A1* | 8/2014 | Sindalovsky ........... H04L 27/01 375/224 |
| 2014/0269881 | A1* | 9/2014 | He .................... H04L 25/03343 375/231 |
| 2015/0180642 | A1 | 6/2015 | Hsieh et al. |
| 2015/0256364 | A1* | 9/2015 | Mobin .............. H04L 25/03057 375/233 |
| 2016/0006589 | A1 | 1/2016 | Kamali |
| 2016/0065394 | A1* | 3/2016 | Sindalovsky ..... H04L 25/03012 375/371 |

OTHER PUBLICATIONS

Shimamura et al., "A Channel Estimation-Based Adaptive Equaliser for Time-Variant Communications Channels," Conference Record of the Twenty-Ninth ASILOMAR Conference on Signals, IEEE, pp. 309-313, XP032133177, DOI: 10.1109/ACSSC. 1995.540562.
EPO Extended Search Report dated Jun. 20, 2017, for corresponding European Patent Application No. 17152471.3 (10 pages).

* cited by examiner

EQUALIZATION IN HIGH SPEED LINKS THROUGH IN-SITU CHANNEL ESTIMATION

CROSS-REFERENCE TO RELATED APPLICATION(S)

This application claims priority to and the benefit of U.S. Provisional Application 62/288,775, filed on Jan. 29, 2016, the entire content of which is incorporated herein by reference.

BACKGROUND

1. Field

Aspects of embodiments of the present invention are directed toward equalization in high-speed links through in-situ channel estimation.

2. Description of Related Art

High-speed serial links, such as fiber optic links, have extensive use in communication applications. An end-to-end channel for such a link includes: a transmitter; a communication medium, such as a fabricated link (e.g., fiber optic cable) or other transmitting medium (e.g., for transmitting radio waves) over which binary data (e.g., 1's and 0's, or +1's and −1's) is transmitted; and a receiver. An input stream d (corresponding to a message at the transmitting end) sent from the transmitter over the communication medium and received by the receiver as an output stream d' may or may not be reconstructible at the receiving end to the original message, based on factors such as the amount of inter symbol interference (ISO introduced by the channel. Two ways of handling ISI are (1) using error correcting codes to encode the message (which build redundancy into the input stream d and allow the message to be reconstructed even when some of the ISI introduces errors into the output stream d'), and (2) using equalization to reduce the amount of ISI.

SUMMARY

Aspects of embodiments of the present invention are directed toward improved equalization in serial channel communication to lessen or minimize ISI introduced by the channel. Further aspects are directed toward improved or optimized use of a continuous time linear equalizer (CTLE) in such communication. Still further aspects are directed toward improved or optimized use of a decision feedback equalizer (DFE) in such communication. Yet still further aspects are directed toward using in situ channel estimation (e.g., in place, or without isolating a channel or channel component from the rest of the system) to improve or optimize such communication.

According to an embodiment of the present invention, a method for estimating performance of a serial communication channel using processing circuits is provided. The channel is configured to transmit a binary input stream from a transmitting end to an output stream at a receiving end. The method includes modeling by the processing circuits the channel at the receiving end as a first finite impulse response (FIR) system. The modeling includes estimating a cursor pulse response of the first FIR system by analyzing the output stream received at the receiving end, and estimating one or more pre-cursor or post-cursor pulse responses of the first FIR system from the received output stream using the estimated cursor pulse response. The method further includes determining by the processing circuits a performance metric by using the estimated one or more pre-cursor or post-cursor pulse responses.

The estimating of the cursor, post-cursor, and pre-cursor pulse responses may include only using addition, subtraction, comparison, and Boolean operators.

The estimating of the one or more pre-cursor or post-cursor pulse responses may include estimating one or more of the pre-cursor pulse responses and one or more of the post-cursor pulse responses.

The estimating of the one or more pre-cursor or post-cursor pulse responses may include estimating two or more of the pre-cursor pulse responses and six or more of the post-cursor pulse responses.

The receiving end may include a continuous time linear equalizer (CTLE) and the modeling of the channel at the receiving end may include modeling the channel at the receiving end after the CTLE.

The CTLE may be configured to be tuned by selecting one of a plurality of settings including a default setting. The estimating of the cursor pulse response may include estimating the cursor pulse response using the default setting.

The estimating of the one or more pre-cursor or post-cursor pulse responses may include estimating the one or more pre-cursor or post-cursor pulse responses for each of two or more of the settings. The determining of the performance metric may include determining the performance metric for each of the two or more of the settings by using a corresponding said estimated one or more pre-cursor or post-cursor pulse responses.

The method may further include comparing by the processing circuits the performance metric of one of the two or more of the settings to the performance metric of another one of the two or more of the settings, and tuning by the processing circuits the CTLE by selecting one of the settings based on the comparison.

The two or more of the settings may include all of the settings.

The settings may be ordered. The estimating of the one or more pre-cursor or post-cursor pulse responses and the determining of the performance metric may include stopping the estimating of the one or more pre-cursor or post-cursor pulse responses and the determining of the performance metric once the performance metric for a next one of the settings is worse than the performance metric for a previous one of the settings.

The receiving end may further include a decision feedback equalizer (DFE) after the CTLE and the modeling of the channel at the receiving end may further include modeling the channel at the receiving end after the DFE.

The transmitting end may include a second FIR system and the method may further include adjusting by the processing circuits the second FIR system based on the corresponding estimated one or more pre-cursor or post-cursor pulse responses of the selected one of the settings.

According to another embodiment of the present invention, a system for estimating performance of a serial communication channel configured to transmit a binary input stream from a transmitting end to an output stream at a receiving end is provided. The system includes a nonvolatile storage medium and processing circuits. The processing circuits are configured to model the channel at the receiving end as a first finite impulse response (FIR) system. The modeling includes estimating a cursor pulse response of the first FIR system by analyzing the output stream received at the receiving end, estimating one or more pre-cursor or post-cursor pulse responses of the first FIR system from the received output stream using the estimated cursor pulse response, and storing the estimated cursor, pre-cursor, and post-cursor pulse responses on the non-volatile storage medium. The processing circuits are further configured to determine a performance metric by using the estimated one or more pre-cursor or post-cursor pulse responses, and store the performance metric on the non-volatile storage medium.

The receiving end may include a continuous time linear equalizer (CTLE) and the modeling of the channel at the receiving end may include modeling the channel at the receiving end after the CTLE.

The CTLE may be configured to be tuned by selecting one of a plurality of settings including a default setting, and the estimating of the cursor pulse response may include estimating the cursor pulse response using the default setting.

The estimating of the one or more pre-cursor or post-cursor pulse responses may include estimating the one or more pre-cursor or post-cursor pulse responses for each of two or more of the settings. The determining of the performance metric may include determining the performance metric for each of the two or more of the settings by using a corresponding said estimated one or more pre-cursor or post-cursor pulse responses.

The processing circuits may be further configured to compare the performance metric of one of the two or more of the settings to the performance metric of another one of the two or more of the settings, tune the CTLE by selecting one of the settings based on the comparison, and store the selected one of the settings on the non-volatile storage medium.

The settings may be ordered, and the estimating of the one or more pre-cursor or post-cursor pulse responses and the determining of the performance metric may include stopping the estimating of the one or more pre-cursor or post-cursor pulse responses and the determining of the performance metric once the performance metric for a next one of the settings is worse than the performance metric for a previous one of the settings.

The receiving end may further include a decision feedback equalizer (DFE) after the CTLE and the modeling of the channel at the receiving end may further include modeling the channel at the receiving end after the DFE.

The transmitting end may include a second FIR system and the processing circuits may be further configured to adjust the second FIR system based on the corresponding estimated one or more pre-cursor or post-cursor pulse responses of the selected one of the settings.

According to yet another embodiment of the present invention, a method for tuning a continuous time linear equalizer (CTLE) in a receiving end of a serial communication channel using processing circuits is provided. The channel is configured to transmit a binary input stream from a transmitting end to an output stream at the receiving end. The CTLE is configured to be tuned by selecting one of a plurality of settings including a default setting. The method includes modeling by the processing circuits the channel at the receiving end after the CTLE as a finite impulse response (FIR) system. The modeling includes estimating a cursor pulse response of the FIR system by analyzing the output stream received at the receiving end using the default setting, and estimating one or more pre-cursor or post-cursor pulse responses of the FIR system from the received output stream using the estimated cursor pulse response. The method further includes determining by the processing circuits a performance metric by using the estimated one or more pre-cursor or post-cursor pulse responses, repeating the estimating of the one or more pre-cursor or post-cursor pulse responses and the determining of the performance metric for more of the settings, comparing by the processing circuits the performance metric for one of the settings to the performance metric for another one of the settings, and tuning by the processing circuits the CTLE by selecting one of the settings based on the comparison.

The receiving end may further include a decision feedback equalizer (DFE) after the CTLE and the modeling of the channel at the receiving end may further include modeling the channel at the receiving end after the DFE.

According to the above and other embodiments, ISI may be reduced or minimized in a high-speed serial channel. Such improvement or optimization may be achieved on a channel when, for example, process variation (e.g., when components that make up the channel, such as processing chips, are fabricated in batches, such as on a wafer) causes similarly fabricated channel components to perform differently. Such improvement or optimization may be further achieved with or without a DFE in the channel.

BRIEF DESCRIPTION OF THE DRAWINGS

The accompanying drawings, together with the specification, illustrate example embodiments of the present invention. These drawings, together with the description, serve to better explain aspects and principles of the present invention.

DETAILED DESCRIPTION

Figure 1:
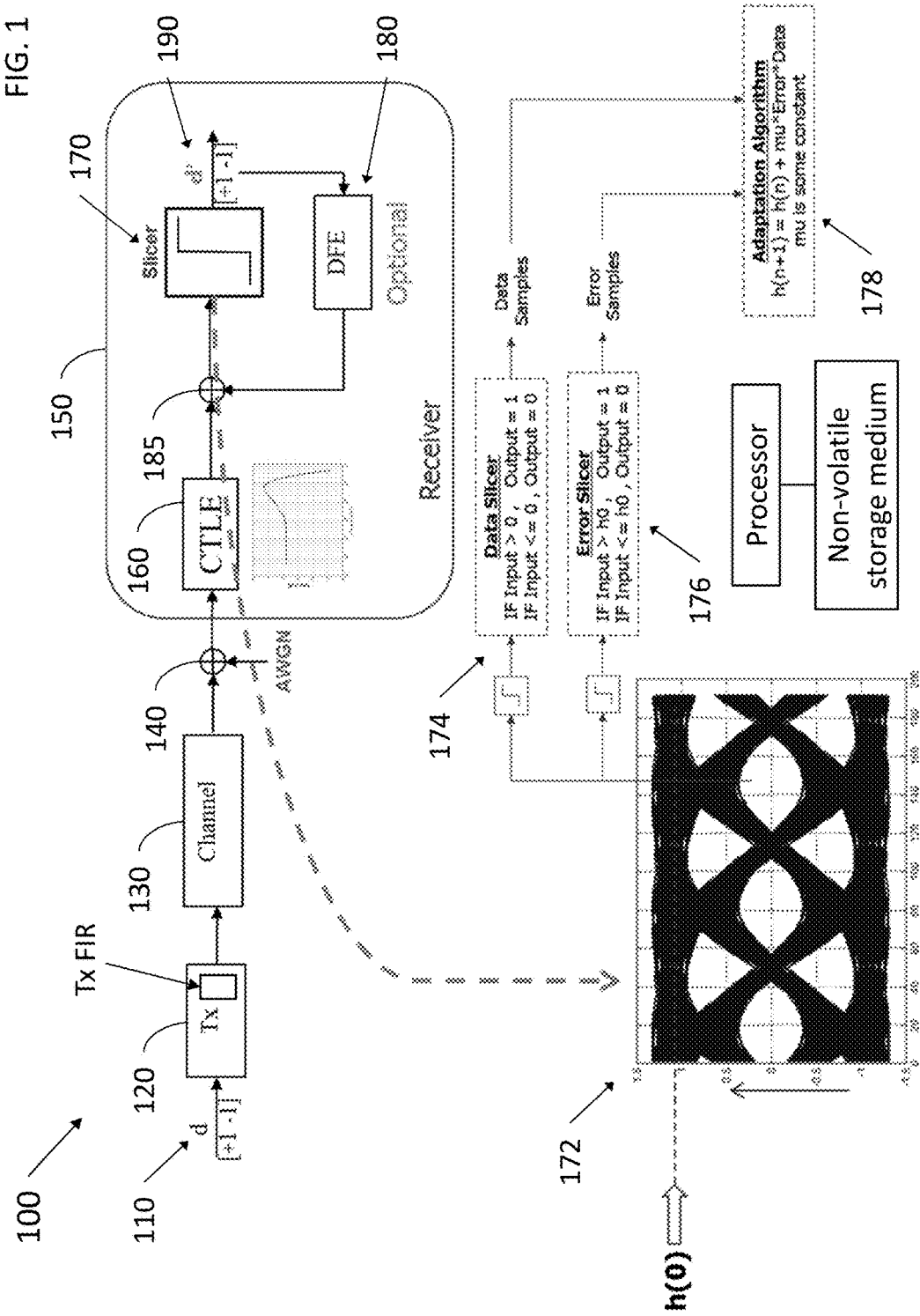
FIG. 1 is a schematic diagram of an example end-to-end channel system according to an embodiment of the present invention.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein.

Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

The electronic or electric devices and/or any other relevant devices or components according to embodiments of the present invention described herein may be implemented utilizing any suitable hardware, firmware (e.g., an application-specific integrated circuit (ASIC)), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

In addition, the various components of these devices may be a process or thread, running on one or more computer processors (such as microprocessors), in one or more computing devices, executing computer program instructions and interacting with other system components for performing the various functionalities described herein. The computer program instructions may be stored in a memory that may be implemented in a computing device using a standard memory device such as random access memory (RAM). The computer program instructions may also be stored in other, non-transitory, computer readable media such as, for example, a CD-ROM, flash drive, or the like.

Further, a person of skill in the art should recognize that the functionality of various computing devices may be combined or integrated into a single computing device, or the functionality of a particular computing device may be distributed across one or more other computing devices without departing from the spirit and scope of the present invention.

Serial high-speed links and their various components, such as the receiver, may include a continuous time linear equalizer (CTLE) as part of an analog front end. As an example, the CTLE may be part of the receiver and used to cancel part or all of the inter symbol interference (ISI) introduced by the channel. However, the CTLE may have many possible settings, each producing a different output stream profile, and thus may need tuning to reduce or minimize ISI. In some cases, a decision feedback equalizer (DFE) may be used in conjunction with the CTLE to better compensate for channel loss. The added DFE may further add to the number of settings that affect the output stream profile. Only a small subset (such as one) of these settings may provide for the best link performance, e.g., the link performance that minimizes inter-symbol interference (ISI) and results in a lower error rate for the link than other settings.

A high-speed serial channel may include chips and other circuits, such as for the receiver. Due to factors such as inconsistencies in the manufacturing process, each chip produced may be subject to small variations that lead to process corners (e.g., some of the chips may perform faster or better, or just differently, than others). Consequently, for example, the CTLE that is integrated into the chip (e.g., a receiver chip) may not account for the process corners, which may vary, for example, across each chip on a wafer or between different production runs. Thus, any default CTLE settings (e.g., for an example CTLE) may be less than optimal for a particular CTLE in a particular receiver. Accordingly, a method of tuning a CTLE to account for non-uniform performance caused by, for example, process corners, may be desired.

In accordance with embodiments of the present invention, methods of determining improved CTLE settings based on channel tap estimation are described herein. These methods may include the use of a first method for estimating end-to-end channel performance and a second method for adjusting the CTLE settings based on the estimated channel performance. The second method may be further modified according to the presence of a DFE in the receiver. A third method may be used to adjust a transmitter finite impulse response (FIR) filter by also using the end-to-end channel estimation. These and other methods of determining improved CTLE and transmitter FIR settings based on the estimation of channel performance according to embodiments of the present invention are described herein.

In one or more embodiments, the end-to-end channel as seen by the receiver (including the CTLE) may be estimated and a performance metric for the estimated channel may be formed. The CTLE settings may then be adjusted and the estimation of the channel and performance metric may be performed again. For example, the system (such as a channel optimization system) may iterate through the CTLE settings until an improved or best combination of settings is determined. The system may be customized to work with or without a DFE in the receiver. For systems with a DFE-equipped receiver, the system may work to reduce or minimize a first metric, and in the absence of a DFE, a second metric may be reduced or minimized.

FIG. 1 is a schematic diagram of an example end-to-end channel system 100 according to an embodiment of the present invention.

Referring to FIG. 1, a Serializer/Deserializer (SerDes, "sir-deez") system 100 is depicted. In this system 100, an input stream d (110) is being transmitted by a producer (or transmitting system). The resulting output stream d' (190) is being provided to an end system (or receiving system). The input stream d may be provided to a transmitter 120 that may serialize and send the stream over a channel 130 to a receiver 150. During the transmission across the channel 130, noise 140 may be added to the stream. Here, the added noise 140 is represented abstractly by an adder between the channel 130 and the receiver 150 that inserts additive white Gaussian noise (AWGN) to the signal. In the embodiment of FIG. 1, the receiver 150 may include a CTLE 160, a (data) slicer 170, and a DFE 180 with an accompanying adder 185. The receiver 150 may output the output stream d' (190) to a receiving system that ultimately consumes the output stream d'.

The DFE implementation may become more complicated due to the timing constraints in the process technology in which the circuits are implemented. In one embodiment, the slicer 170 may be doubled or quadrupled to reduce the speed at which each of the slicers 170 operates. In another embodiment, a technique called unrolled DFE may be used where the first feedback tap is implemented indirectly. All of these different configurations are within the spirit and scope of the present invention as the disclosed methods may be applied to any of them.

FIG. 1 also depicts an example data slicer operation 174, 176, 178 of the slicer 170 and an example eye diagram 172. The eye diagram 172 illustrates about three unit intervals of a digital binary signal that takes on two values (e.g., high and low, or about +1 and −1 on the y-axis) and having a unit interval of between 63 and 65 x-axis units (as obtained, for example, by inspection and approximation using the x-axis legend). Also illustrated are transitions of the binary digital signal between the high and low values (the transitions being about one unit interval in length) and a cursor tap (or center tap or main tap) pulse response $h_0$ ("h naught") at a little over +1 on the y-axis. The cursor pulse response $h_0$ represents the peak data value at the intended time of signal arrival. Another way of expressing this is that the cursor pulse response $h_0$ is the true data and not noise from other signals intended to be delivered at other times (e.g., at other unit intervals).

The cursor pulse response $h_0$ represents the dominant component of a finite impulse response (FIR) filter aligning with the intended signal, and may be a large positive value (corresponding to a high data signal) whose effect is to amplify the intended signal. Likewise, other pulse responses, such as pre-cursor tap pulse responses $h_{-1}$ and $h_{-2}$ corresponding to later signals in the output stream and post-cursor tap pulse responses $h_1$ and $h_2$ corresponding to earlier signals in the output stream, may also be used by the FIR filter to cancel interfering effects from signals other than the intended signal. The post-cursor and pre-cursor pulse responses may be smaller negative values, whose effects are to attenuate the ISI introduced into the channel from signals other than the intended signal.

Here, the integer value k (+ or −) in the k-th pulse response $h_k$ corresponds to, for example, the number of unit intervals between the cursor pulse response $h_0$ and the k-th pulse response $h_k$. The unit interval is somewhat arbitrary, depending on the application, and in other embodiments, may refer to a fraction (such as a half) or a multiple (such as two) of the period of a repeating (e.g., wavelike) signal.

The slicer 170 may process the output stream using two operations 174 and 176. In step 174 (data slicer), the next signal (e.g., one unit interval after the previous signal) in the output stream is sensed. If its value is greater than 0 (on the y-axis), the signal (e.g., next data signal) is assigned the value 1, and otherwise the next data signal is assigned the value 0. Here, the output stream d' is a binary stream composed of two distinct values, namely 1 and 0. However, the assignment of these distinct values to the binary stream is somewhat arbitrary, e.g., in other embodiments, the values may be +1 and −1, such as with the input stream d 110 and the output stream d' 190. In step 174, the slicer 170 is comparing for high values, and determines that any positive value of the output signal (such as the output signal having the eye diagram 172) is a high value. Repeated applications of step 174 (data slicer) on different signals of the output stream produces a data stream (of data samples), identifying those signals closer to the high value than to the low value and assigning them the value 1 as a data sample (and otherwise assigning the value 0).

In a similar fashion, in step 176 (error slicer), the next signal in the output stream is further processed by the slicer 170, this time to produce a next error signal. The error signal is another binary value (e.g., 0 or 1) used to characterize the output stream. Here, the error signal may help characterize the magnitude of the next data signal (such as larger than some value). For example, the slicer 170 may compare the next signal to the cursor pulse response $h_0$ (e.g., a peak data value), and may output a next error signal of 1 if the next signal is greater than the cursor pulse response $h_0$ and otherwise output the next error signal as 0. Thus, in step 176, the slicer 170 may be looking for even higher values than those used to produce the data stream above. Further, through repeated applications of step 176 (error slicer) on different signals of the output stream, the slicer 170 may produce an error stream, identifying those data signals exceeding a peak data value.

In some embodiments, the function of the error slicer 176 may be handled by two components, such as one error slicer for positive data and another error slicer for negative data. For ease of implementation and description, however, only the steps for processing the error slicer for positive data signals will be described, and it will be understood that one of ordinary skill may adapt these to process the error slicer for the negative data signals instead of or in addition to the positive data signals without departing from the scope of the present invention.

In step 178, adaptation is performed using the data and error signals to produce the pulse response $h_k$. For example, adaptation engine 178 may use a small increment or decrement value μ, such as $μ=2^{-10}$, to gradually adjust (or adapt) the pulse response values to closer estimates of a corresponding FIR filter, as will be described in further detail below.

Figure 2:
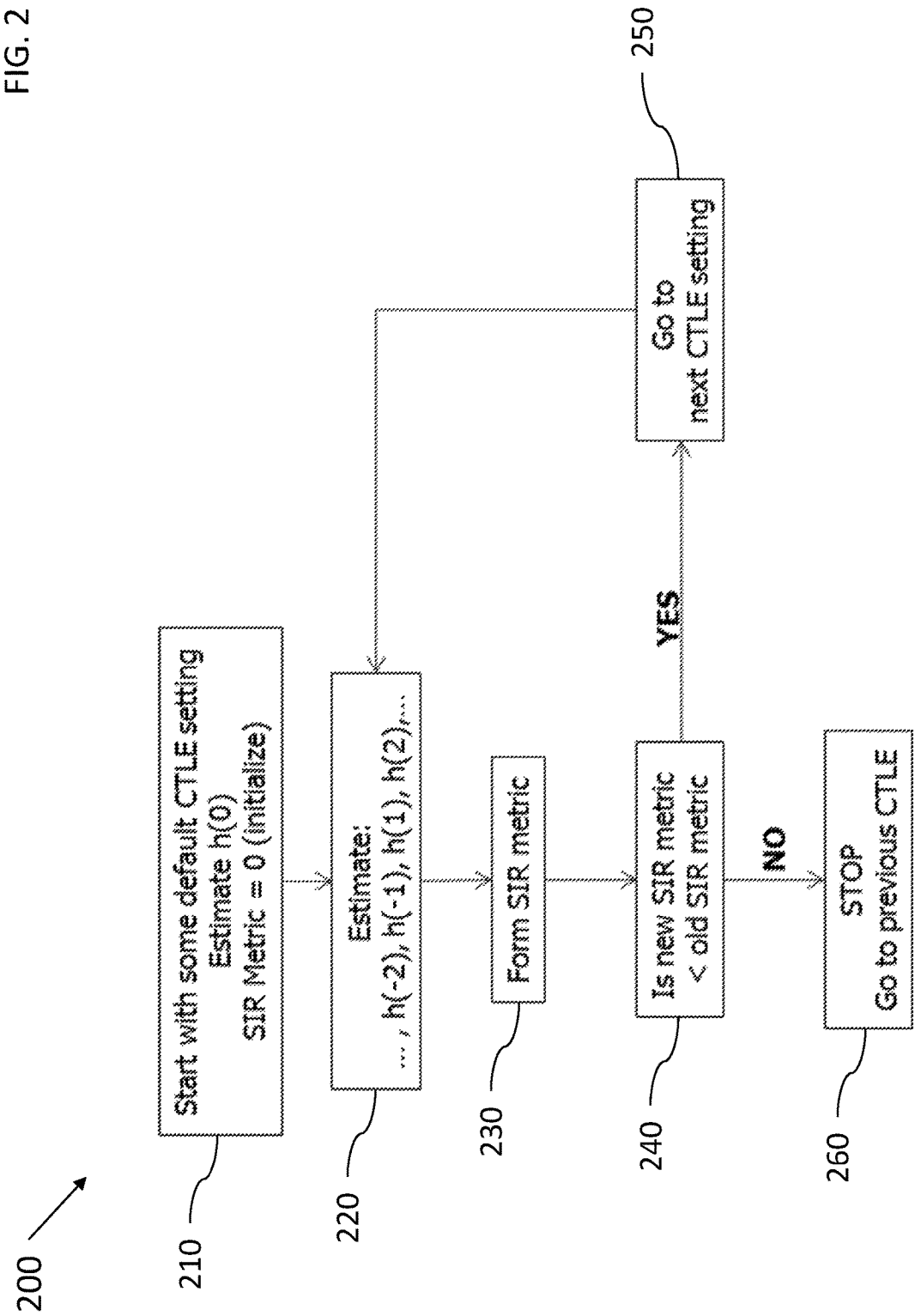
FIG. 2 is a flow diagram of an example method of determining improved or optimal CTLE settings of a receiver according to an embodiment of the present invention.

FIG. 2 is a flow diagram of an example method 200 of determining improved or optimal CTLE settings of a receiver according to an embodiment of the present invention.

This and other methods disclosed herein may be implemented, for example, as a series of computer instructions to be executed by a processor (as shown in FIG. 1) (or other computing device), such as a microprocessor, or two or more processors. The processor(s) may execute computer program instructions and interact with other system components for performing the various functionalities described herein. The computer program instructions may be stored in a memory implemented using a standard memory device, such as, for example, a random access memory (RAM), or in a non-volatile storage medium (as shown in FIG. 1). The computer program instructions may also be stored in other non-transitory computer readable media such as, for example, a CD-ROM, flash drive, or the like. The methods may also be implemented using hardware circuits (e.g., transistors, capacitors, logic gates, field programmable gate arrays (FPGAs), etc.), or combinations of hardware circuits, software, and firmware, as would be apparent to one of ordinary skill.

Referring to FIG. 2, method 200 includes simulating the pulse response of the channel at various uniform time intervals (e.g., pre-cursor, cursor, and post-cursor) under a FIR methodology. It is assumed that a CTLE is being used as a front-end to the receiver. The resulting pulse response values (e.g., pre-cursor pulse responses $h_{-1}$, $h_{-2}$, etc.; cursor pulse response $h_0$; and post-cursor pulse responses $h_1$, $h_2$, etc.) allow the channel behavior to be accurately measured, and the desired CTLE settings determined. In practice, these pulse response values $h_k$ normally decay rapidly with increasing magnitude (positive or negative) of k, so only a few values of $h_k$ are usually sufficient to estimate the channel.

In method 200, processing begins, and in step 210, an initial pulse response $h_0$ is calculated (or estimated or adapted) by iterating equations 1, 2, 3, and 4:

$$d_0(n) = \text{sign}[y(n)] \quad (1)$$

$$z_0(n) = y(n) \times d_0(n) - h_0(n) \quad (2)$$

$$e_0(n) = \text{sign}[z(n)] \quad (3)$$

$$h_0(n+1) = h_0(n) + e_0(n) \times μ \quad (4)$$

where:
 $d_0(n)$ is the n-th value of the data stream,
 $z_0(n)$ is the n-th error estimate after adjusting for $h_0$,
 $e_0(n)$ is the n-th value of the error stream,
 $h_0(n)$ is the n-th estimate of $h_0$,
 y(n) is the (default) CTLE output at time index n,
 $h_0(0)$ is initialized to 0,
 sign(x) is the sign function, returning 1 if x≥0, and −1 if x<0, and
 μ is a small increment or decrement, such as $2^{-10}$, Here, $d_0(n)$ indicates whether the current output signal from the channel is positive or negative, $h_0(n)$ represents a slowly increasing approximation of the cursor pulse response $h_0$, $z_0(n)$ is the difference between the magnitude (e.g., absolute value) of the current output signal and the cursor pulse approximation, and $e_0(n)$ indicates whether this difference is positive or negative. Accordingly, when the magnitude of the current output signal exceeds the current estimate of $h_0$, the estimate is incremented slightly and the process repeated. Likewise, when the magnitude of the current output signal falls short of the current estimate of $h_0$, the estimate is decremented slightly and the process repeated. It should be noted that this procedure only makes use of addition/subtraction/negation, logical XOR (Boolean exclusive OR), and compare (sign information only, such as less than or greater than). Any multiplication is either by 1 or −1 (e.g., negation), so can be carried out with much simpler circuits than ordinary multiplication.

It may be assumed that the channel is sufficiently noisy that errors occur at a rate of about $10^{-3}$ (e.g., about 1 in 1000) with default CTLE settings and without a DFE. Accordingly, if the iteration in step 210 is repeated, for example, several thousand times, and the data stream and error stream have a reasonable number of +1's and −1's, then $h_0(n)$ converges quickly (or its rate of growth slows considerably). Accordingly, the cursor pulse response $h_0$ may be estimated quickly and accurately using equations 1, 2, 3, and 4.

The $h_0$ estimation may be utilized to make further estimations for a plurality uniform time intervals (e.g., for other pulse response values) for the default as well as other CTLE settings. For example, referring back to FIG. 2, in step 220, the pulse response may be estimated for two preceding uniform time intervals (pre-cursors $h_{-1}$ and $h_{-2}$) and for 6 to 8 later uniform time intervals (post-cursors $h_1$, $h_2$, etc.)

In one embodiment, the post-cursor pulse response $h_k$ (k=1, 2, etc.), may be estimated (or adapted) iteratively using equations 5, 6, 7, and 8:

$$d_k(n) = \text{sign}[y(n)] \times \text{sign}[y(n-k)] \quad (5)$$

$$z_k(n) = z_0(n) \times d_k(n) + h_k(n) \quad (6)$$

$$e_k(n) = \text{sign}[z_k(n)] \quad (7)$$

$$h_k(n+1) = h_k(n) - e_k(n) \times \mu \quad (8)$$

where:
$d_k(n)$ is the n-th value of the data stream conditioned on the (n−k)-th value of the data stream,
$z_k(n)$ is the n-th error estimate after adjusting for $h_k$,
$e_k(n)$ is the n-th value of the error stream conditioned on the (n−k)-th value of the data stream,
$h_k(n)$ is the n-th estimate of $h_k$,
y(n) is the CTLE output (for the CTLE setting being tested) at time index n,
$d_k(n)$ is initialized to 0 for all n<k,
$h_k(0)$ is initialized to 0,
sign(x) is the sign function, returning 1 if x≥0, and −1 if x<0, and
μ is a small increment or decrement, such as $2^{-10}$.

Here, $d_k(n)$ indicates whether the current output signal y(n) from the channel is positive or negative, and coincides with another positive or negative output signal k unit intervals earlier (e.g., y(n−k)), $h_k(n)$ represents a slowly decreasing approximation of the post-cursor pulse response $h_k$ (assuming the pulse response is a negative value), $z_k(n)$ is the difference between the magnitude (e.g., absolute value) of the current error and the post-cursor pulse response approximation, and $e_k(n)$ indicates whether this difference is positive or negative.

Accordingly, when the current error exceeds (in magnitude, ignoring sign) the current estimate of the k-th post-cursor pulse response $h_k(n)$, the estimate is decremented slightly (to a larger magnitude negative number) and the process repeated. Likewise, when the current error falls short of the current estimate of $h_k(n)$, the estimate is incremented slightly and the process repeated. It should also be noted that, like the cursor pulse response $h_0$ technique above, this procedure only makes use of addition/subtraction/negation, logical AND (Boolean multiplication), and compare (sign information only, such as less than or greater than). Any multiplication is either by 1 or −1 (e.g., negation), so can be carried out with much simpler circuits than ordinary multiplication.

Again, it may be assumed that the channel is sufficiently noisy that errors occur at a rate of about $10^{-3}$ (e.g., about 1 in 1000) with default CTLE settings and without a DFE. Accordingly, if the iteration is repeated, for example, several thousand times, and the data stream and error stream have a reasonable number of +1's and −1's, then $h_k(n)$ converges quickly (or its rate of growth slows considerably). Accordingly, the k-th post-cursor pulse response $h_k$ may be estimated quickly and accurately using equations 5, 6, 7, and 8.

In a similar fashion, equations 5, 6, 7, and 8 may further be used to estimate the pre-cursor pulse responses (e.g., pre-cursors pulse responses $h_{-1}$ and $h_{-2}$), only substituting negative integers for k. With pre-cursor pulse responses, (n−k)-th values of the signals take place after the corresponding n-th values of the signals, since n−k is larger than n for negative values of k.

In one embodiment, the $h_k$ estimations for the earlier pulse responses (e.g., closer to the cursor tap $h_0$) may be utilized to make estimations of the later post-cursor and pre-cursor pulse responses (e.g., further from the cursor tap $h_0$). For example, the estimates for $h_0$ and $h_1$ may be used to estimate the post-cursor $h_2$ or the pre-cursor $h_{-1}$ in a similar fashion to how the $h_0$ estimate is used to estimate the post-cursor $h_1$, as would be apparent to one of ordinary skill in the art.

Referring back to FIG. 2, in step 230, a signal to ISI ratio (SIR) metric may then be calculated after the pulse response for each of the time intervals has been determined. The SIR metric may be calculated a number of different ways. For example, in one embodiment, SIR may be calculated according to equations 9 or 10 depending on whether a DFE is being used. This embodiment may be selected for systems where minimizing the mean square error is desired.

$$SIR(\text{no } DFE) = \frac{h_0^2}{\sum_{i \neq 0} h_i^2} \quad (9)$$

$$SIR(DFE) = \frac{h_0^2}{\sum_{i < 0 \text{ or } i > numDFEtaps} h_i^2} \quad (10)$$

where numDFEtaps is the number of taps in the DFE and the summations take place over all $h_i$ for which estimates are obtained in step 220 (e.g., $h_{-2}$, $h_{-1}$, $h_1$, $h_2$, $h_3$, $h_4$, $h_5$, $h_6$) other than those explicitly excluded.

In some cases, a system may not be mean square error limited and the metric of maximum absolute error (also called peak distortion) is more relevant. Accordingly, in another embodiment, SIR may be calculated according to equations 9 or 10 depending on whether a DFE is being used.

$$SIR(\text{no } DFE) = \frac{h_0}{\sum_{i \neq 0} |h_i|} \quad (9)$$

$$SIR(DFE) = \frac{h_0}{\sum_{i < 0 \text{ or } i > numDFEtaps} |h_i|} \quad (10)$$

In yet another embodiment, in some cases the ISI may have only a single dominant cursor. For example, a DFE may be able to handle the ISI at the other taps. In these cases, SIR may be calculated according to equation 11.

$$SIR(DFE) = h_{-1} \quad (11)$$

Here, $h_{-1}$ is used by way of example, but in other embodiments, a different cursor, such as $h_{-2}$, $h_{-3}$, or $h_4$ (e.g., when numDFEtaps=3), may be used depending on factors such as the main source of ISI.

In step 240, once the current (or new) SIR metric has been calculated or otherwise determined, it may be compared to the best (or old) SIR metric. If the new metric is better than the old one, then in step 250, the new metric is saved and the next CTLE setting is tested. For example, the CTLE settings may be ordered, the SIR metrics determined based on this ordering, and the default setting may be the first such setting in the ordering. It may be characteristic of the SIR metrics for the CTLE setting ordering that the corresponding SIR metrics are monotonically increasing to a single peak (maximum) and then monotonically decreasing thereafter. In this case, in step 260, if instead the new metric is lower than that of the previous (or old) CTLE setting, then processing may stop, as the peak has been reached by the previous CTLE setting.

In other embodiments, such as when this property does not apply, or the property applies but the default CTLE setting may be in the middle of the ordered CTLE settings, further CTLE settings may be tested, such as all of the CTLE settings, or those before the default CTLE settings once those after the CTLE setting have had corresponding decreasing SIR metrics.

Figure 3:
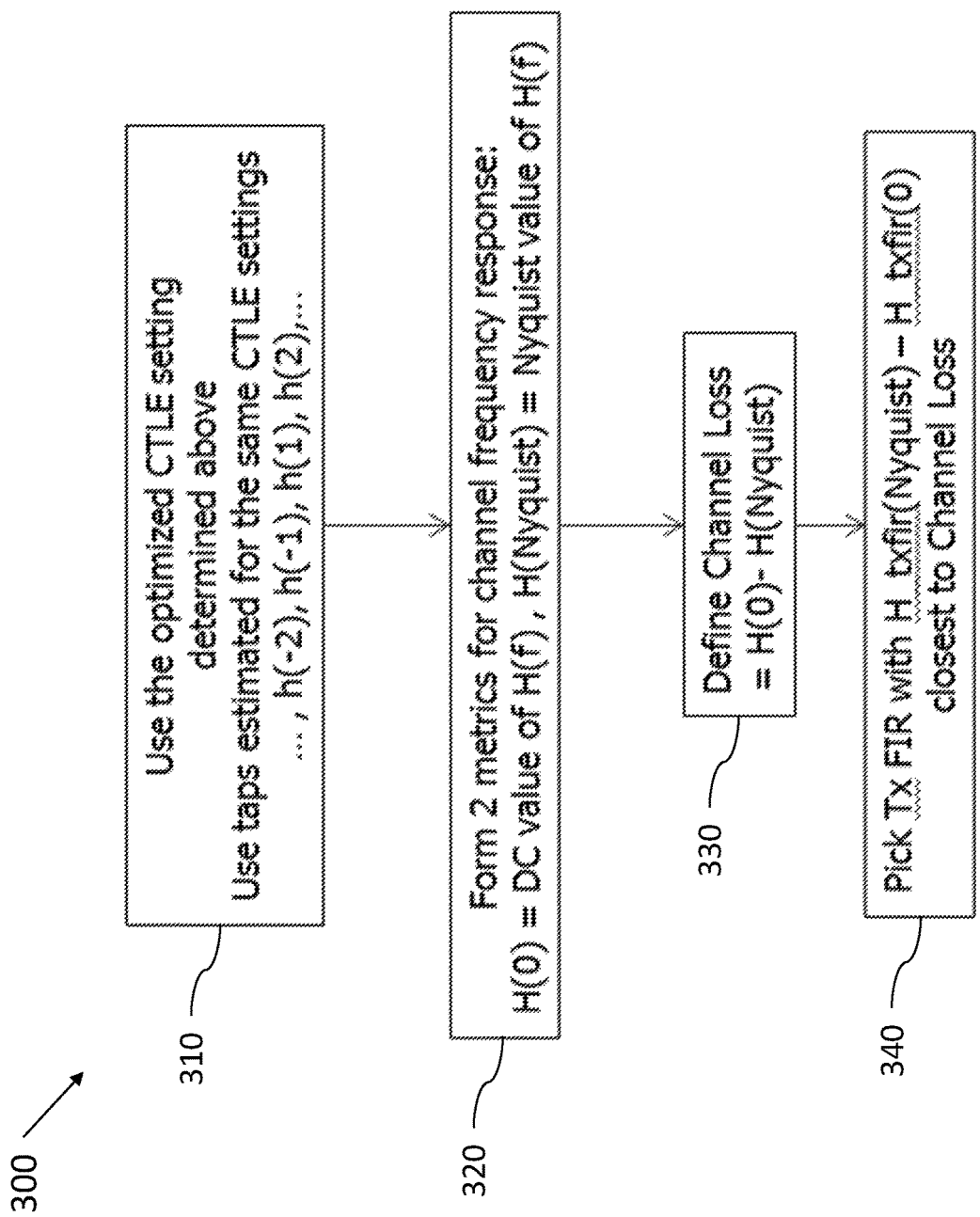
FIG. 3 is a flow diagram of an example method of determining improved or optimal transmitter finite impulse response (FIR) settings according to an embodiment of the present invention.

FIG. 3 is a flow diagram of an example method 300 of determining improved or optimal transmitter (TX) FIR settings according to an embodiment of the present invention.

Referring to FIG. 3, once the CTLE settings have been selected (for example, using the method of FIG. 2 described above), transmitter finite impulse response (FIR) settings may also be improved or optimized. In method 300, processing begins, and in step 310, the CTLE settings determined above and the corresponding pulse response estimates may be used in step 320 to determine two metrics of channel frequency response, H(0) and H(Nyquist). In step 330, the channel loss may then be defined as the difference between H(0) and H(Nyquist). In step 340, a Tx FIR (transmitter FIR) may then be selected that is closest to the defined channel loss.

H(0) and H(Nyquist) may be calculated according to equations 12 and 13.

$$H(0) = \sum_i h_i \quad (12)$$

$$H(Nyquist) = \sum_i (-1)^i h_i \quad (13)$$

One example of TX FIR look up table is shown below in Table 1. Many variations of the table may be constructed as would be apparent to one of ordinary skill.

TABLE 1

| H(0) - H(Nyquist) of channel * CTLE [dB] | H(Nyquist) - H(0) of TX FIR [dB] |
|---|---|
| <6 dB | 2 dB |
| 6 dB to 10 dB | 4 dB |
| 10 dB to 14 dB | 8 dB |
| 14 dB and above | 12 dB |

According to one or more embodiments of the present invention, a method to improve or optimize some or all elements of a link (such as a high-speed link in a SerDes system) is provided, and the method may be used to lessen or cancel channel ISI. According to another embodiment of the present invention, the method may be used for a UDDI (Universal Description, Discovery, and Integration) interface.

According to the above and other embodiments of the present invention, a method to estimate the end-to-end channel using existing hardware that provides sign information only is provided. According to other embodiments, a method of tuning a CTLE based on estimating channel characteristics, such as FIR coefficients, is provided. Some of these embodiments include a DFE in the receiver, while others have no DFE in the receiver. According to still other embodiments, a method of adjusting a transmitter FIR based on estimating channel characteristics using existing hardware is provided.

While certain embodiments of the present invention have been illustrated and described, it is understood by those of ordinary skill in the art that certain modifications and changes can be made to the described embodiments without departing from the spirit and scope of the present invention as defined by the following claims, and equivalents thereof.

What is claimed is:

1. A method for estimating performance of a serial communication channel using a processor, the channel being configured to transmit a binary input stream from a transmitter to an output stream at a receiver, the method comprising:
    modeling by the processor the channel as a finite impulse response (FIR) filter model, the modeling comprising:
        estimating a cursor pulse response of the FIR filter model by analyzing the output stream received at the receiver; and
        estimating one or more pre-cursor or post-cursor pulse responses of the FIR filter model from the received output stream using the estimated cursor pulse response; and
    determining by the processor a performance metric by using the estimated one or more pre-cursor or post-cursor pulse responses,
    wherein:
        the performance metric consist of:
            a pre-cursor pulse response; or
            a post-cursor pulse response, or
            the determining of the performance metric comprises evaluating an expression selected from the group consisting of:

$$\frac{h_0^2}{\sum_{i \neq 0} h_i^2},$$

$$\frac{h_0^2}{\sum_{i<0 \text{ or } i>numDFEtaps} h_i^2},$$

$$\frac{h_0}{\sum_{i \neq 0} |h_i|}, \text{ and}$$

$$\frac{h_0}{\sum_{i<0 \text{ or } i>numDFEtaps} |h_i|},$$

wherein $h_0$ is the estimated cursor pulse response, $h_i$, for $i<0$, is the $i^{th}$ estimated pre-cursor pulse response, $h_i$, for $i>0$, is the $i^{th}$ estimated post-cursor pulse response, and, when the receiver comprises a decision feedback equalizer, numDFEtaps is a number of taps of the decision feedback equalizer.

2. The method of claim 1, wherein the estimating of the cursor, post-cursor, and pre-cursor pulse responses comprises only executing operations selected from the group consisting of addition, subtraction, comparison, and Boolean operators.

3. The method of claim 1, wherein the estimating of the one or more pre-cursor or post-cursor pulse responses comprises estimating one or more of the pre-cursor pulse responses and one or more of the post-cursor pulse responses.

4. The method of claim 3, wherein the estimating of the one or more pre-cursor or post-cursor pulse responses comprises estimating two or more of the pre-cursor pulse responses and six or more of the post-cursor pulse responses.

5. The method of claim 1, wherein the receiver comprises a continuous time linear equalizer (CTLE) and the modeling of the channel comprises modeling the channel after the CTLE.

6. The method of claim 5, wherein
the CTLE is configured to be tuned by selecting one of a plurality of settings including a default setting, and
the estimating of the cursor pulse response comprises estimating the cursor pulse response using the default setting.

7. The method of claim 6, wherein
the estimating of the one or more pre-cursor or post-cursor pulse responses comprises estimating the one or more pre-cursor or post-cursor pulse responses for each of two or more of the settings; and
the determining of the performance metric comprises determining the performance metric for each of the two or more of the settings by using a corresponding said estimated one or more pre-cursor or post-cursor pulse responses.

8. The method of claim 7, further comprising:
comparing by the processor the performance metric of one of the two or more of the settings to the performance metric of another one of the two or more of the settings; and
tuning by the processor the CTLE by selecting one of the settings based on the comparison.

9. The method of claim 8, wherein the two or more of the settings comprise all of the settings.

10. The method of claim 8, wherein the settings are ordered, and the estimating of the one or more pre-cursor or post-cursor pulse responses and the determining of the performance metric comprise stopping the estimating of the one or more pre-cursor or post-cursor pulse responses and the determining of the performance metric once the performance metric for a next one of the settings is worse than the performance metric for a previous one of the settings.

11. The method of claim 8, wherein the receiver comprises the decision feedback equalizer (DFE) after the CTLE and the modeling of the channel further comprises modeling the channel after the DFE.

12. The method of claim 8, wherein the transmitter comprises a FIR filter and the method further comprises adjusting by the processor the FIR filter based on the corresponding estimated one or more pre-cursor or post-cursor pulse responses of the selected one of the settings.

13. A system for estimating performance of a serial communication channel configured to transmit a binary input stream from a transmitter to an output stream at a receiver, the receiver comprising:
a non-volatile storage medium; and
a processor configured to:
model the channel as a finite impulse response (FIR) filter model, the modeling comprising:
estimating a cursor pulse response of the FIR filter model by analyzing the output stream received at the receiver;
estimating one or more pre-cursor or post-cursor pulse responses of the FIR filter model from the received output stream using the estimated cursor pulse response; and
storing the estimated cursor, pre-cursor, and post-cursor pulse responses on the non-volatile storage medium;
determine a performance metric by using the estimated one or more pre-cursor or post-cursor pulse responses; and
store the performance metric on the non-volatile storage medium,
wherein:
the performance metric consist of:
a pre-cursor pulse response; or
a post-cursor pulse response, or
the determining of the performance metric comprises evaluating an expression selected from the group consisting of:

$$\frac{h_0^2}{\sum_{i \neq 0} h_i^2},$$

$$\frac{h_0^2}{\sum_{i<0 \text{ or } i>numDFEtaps} h_i^2},$$

$$\frac{h_0}{\sum_{i \neq 0} |h_i|}, \text{ and}$$

$$\frac{h_0}{\sum_{i<0 \text{ or } i>numDFEtaps} |h_i|},$$

wherein $h_0$ is the estimated cursor pulse response, $h_i$, for $i<0$, is the $i^{th}$ estimated pre-cursor pulse response, $h_i$, for $i>0$, is the $i^{th}$ estimated post-cursor pulse response, and, when the receiver comprises a decision feedback equalizer, numDFEtaps is a number of taps of the decision feedback equalizer.

14. The system of claim 13, wherein the receiver further comprises a continuous time linear equalizer (CTLE) and the modeling of the channel comprises modeling the channel after the CTLE.

15. The system of claim 14, wherein
the CTLE is configured to be tuned by selecting one of a plurality of settings including a default setting, and
the estimating of the cursor pulse response comprises estimating the cursor pulse response using the default setting.

16. The system of claim 15, wherein
the estimating of the one or more pre-cursor or post-cursor pulse responses comprises estimating the one or more pre-cursor or post-cursor pulse responses for each of two or more of the settings; and
the determining of the performance metric comprises determining the performance metric for each of the two or more of the settings by using a corresponding said estimated one or more pre-cursor or post-cursor pulse responses.

17. The system of claim 16, wherein the processor is further configured to:
compare the performance metric of one of the two or more of the settings to the performance metric of another one of the two or more of the settings;
tune the CTLE by selecting one of the settings based on the comparison; and
store the selected one of the settings on the non-volatile storage medium.

18. The system of claim 17, wherein the settings are ordered, and the estimating of the one or more pre-cursor or post-cursor pulse responses and the determining of the performance metric comprise stopping the estimating of the one or more pre-cursor or post-cursor pulse responses and the determining of the performance metric once the performance metric for a next one of the settings is worse than the performance metric for a previous one of the settings.

19. The system of claim 17, wherein the receiver comprises the decision feedback equalizer (DFE) after the CTLE and the modeling of the channel further comprises modeling the channel after the DFE.

20. The system of claim 17, wherein the transmitter comprises a FIR filter and the processor is further configured to adjust the FIR filter of the transmitter based on the corresponding estimated one or more pre-cursor or post-cursor pulse responses of the selected one of the settings.

21. A method for tuning a continuous time linear equalizer (CTLE) in a receiver of a serial communication channel using a processor, the channel being configured to transmit a binary input stream from a transmitter to an output stream at the receiver, the CTLE being configured to be tuned by selecting one of a plurality of settings including a default setting, the method comprising:
modeling by the processor the channel after the CTLE as a finite impulse response (FIR) filter model, the modeling comprising:
estimating a cursor pulse response of the FIR filter model by analyzing the output stream received at the receiver using the default setting; and
estimating one or more pre-cursor or post-cursor pulse responses of the FIR filter model from the received output stream using the estimated cursor pulse response;
determining by the processor a performance metric by using the estimated one or more pre-cursor or post-cursor pulse responses;
repeating the estimating of the one or more pre-cursor or post-cursor pulse responses and the determining of the performance metric for more of the settings;
comparing by the processor the performance metric for one of the settings to the performance metric for another one of the settings; and
tuning by the processor the CTLE by selecting one of the settings based on the comparison,
wherein:
the performance metric consist of:
a pre-cursor pulse response; or
a post-cursor pulse response, or
the determining of the performance metric comprises evaluating an expression selected from the group consisting of:

$$\frac{h_0^2}{\sum_{i \neq 0} h_i^2},$$

$$\frac{h_0^2}{\sum_{i<0 \text{ or } i>numDFEtaps} h_i^2},$$

$$\frac{h_0}{\sum_{i \neq 0} |h_i|}, \text{ and}$$

$$\frac{h_0}{\sum_{i<0 \text{ or } i>numDFEtaps} |h_i|},$$

wherein $h_0$ is the estimated cursor pulse response, $h_i$, for $i<0$, is the $i^{th}$ estimated pre-cursor pulse response, $h_i$, for $i>0$, is the $i^{th}$ estimated post-cursor pulse response, and, when the receiver comprises a decision feedback equalizer, numDFEtaps is a number of taps of the decision feedback equalizer.

22. The method of claim 21, wherein the receiver comprises the decision feedback equalizer (DFE) after the CTLE and the modeling of the channel further comprises modeling the channel after the DFE.

* * * * *